United States Patent
Hyman et al.

(10) Patent No.: US 8,580,873 B2
(45) Date of Patent: Nov. 12, 2013

(54) AQUEOUS DISPERSION COMPRISING A (METH)ACRYLIC POLYMER AND A VINYL ACETATE POLYMER

(75) Inventors: Larry N. Hyman, Midland, MI (US); Kim Struble, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 598 days.

(21) Appl. No.: 12/665,488

(22) PCT Filed: May 7, 2008

(86) PCT No.: PCT/US2008/062849
§ 371 (c)(1),
(2), (4) Date: Jul. 30, 2010

(87) PCT Pub. No.: WO2009/009216
PCT Pub. Date: Jan. 15, 2009

(65) Prior Publication Data
US 2010/0294430 A1 Nov. 25, 2010

Related U.S. Application Data

(60) Provisional application No. 60/959,222, filed on Jul. 12, 2007.

(51) Int. Cl.
*C08L 1/26* (2006.01)

(52) U.S. Cl.
USPC ...... 524/44; 524/2; 524/5; 524/423; 524/424; 524/425; 524/427; 524/446; 524/449; 524/451; 524/492; 524/493; 524/521; 524/523; 524/524; 524/535

(58) Field of Classification Search
USPC ......... 524/2, 5, 423, 424, 425, 427, 446, 449, 524/451, 521, 523, 524, 44, 492, 493, 535
See application file for complete search history.

(56) References Cited

U.S. PATENT DOCUMENTS

| | | |
|---|---|---|
| 4,678,711 A | 7/1987 | Atkins et al. |
| 5,313,755 A | 5/1994 | Koenig |
| 5,406,973 A | 4/1995 | Lange et al. |
| 5,494,947 A | 2/1996 | Kaplan |
| 5,837,089 A | 11/1998 | Magrum |
| 6,884,830 B1 | 4/2005 | Hornaman |
| 2007/0255000 A1* | 11/2007 | Bardman et al. ............ 524/458 |

* cited by examiner

*Primary Examiner* — David W Wu
*Assistant Examiner* — Marie Reddick
(74) *Attorney, Agent, or Firm* — Brian J. Hubbard; Andrew E. C. Merriam

(57) ABSTRACT

The present invention relates to an aqueous dispersion comprising (a) at least one (meth)acrylic polymer; (b) at least one vinyl acetate polymer selected from vinyl acetate homopolymer and vinyl acetate copolymers comprising in polymerized form vinyl acetate and ethylene; (c) water; and (d) optionally up to 50% by weight of an inorganic filler, based on the total weight of the aqueous dispersion, wherein the weight ratio of (meth)acrylic polymer(s) (a) to vinyl acetate polymer(s) (b) is from 70:30 to 30:70. The aqueous dispersion may be used as a joint compound or sealing compound.

15 Claims, No Drawings

AQUEOUS DISPERSION COMPRISING A (METH)ACRYLIC POLYMER AND A VINYL ACETATE POLYMER

CROSS REFERENCE TO RELATED APPLICATIONS

This application is a 35 USC §371 national phase filing of PCT/US2008/062849 filed May 7, 2008, which claims the benefit of U.S. Ser. No. 60/959,222, filed Jul. 12, 2007.

The present invention relates to an aqueous dispersion comprising a (meth)acrylic polymer and a vinyl acetate polymer and uses of said dispersion, especially as a joint compound.

When gypsum board panels (also known as "drywalls" or "wallboards" or "gypsum plaster boards") or the like are used as a wall surfacing in the construction of houses and other structures, joint compounds are typically used in combination with a joint tape material to close and fill the joints and corners between adjoining panels.

The two main components of typical joint compounds are a filler, usually in high amounts, and a binder. Conventional fillers are inert fillers such as calcium carbonate and calcium sulfate dihydrate (gypsum), or reactive fillers such as calcium sulfate hemihydrate. The type of filler determines whether the joint compound is a setting or a drying compound.

A major portion of the filler in setting joint compounds is calcium sulfate hemihydrate. Optionally, small portions of inert fillers such as calcium carbonate, talc, mica, silica, clays, expanded perlite, calcium sulfate dihydrate, and other mineral fillers can be added to setting type joint compounds. The calcium sulfate hemihydrate takes up some of the water in the mix by hydration to form calcium sulfate dihydrate crystals when the compound sets. The balance of water evaporates or is absorbed into the substrate.

Calcium carbonate is normally the major portion of filler in drying type joint compounds. Optionally, small portions of other inert fillers such as talc, mica, silica, clays, expanded perlite, and other mineral fillers can also be added to drying type joint compounds. An organic binder serves to provide cohesive strength to the joint compound and to bond the compound to a surface. Examples of typical binders are poly(vinyl acetate), vinyl acetate copolymers, and poly(vinyl alcohol). Hardening occurs as the water is eliminated through evaporation or absorption into the substrate.

In a widely used technique for filling gypsum board joints, a high viscosity joint compound paste is applied in order to close the joint. A fiberglass, cloth, or paper taping material is then stretched over the joint and embedded in the soft joint compound. An overlayer or top dressing of the joint compound may be applied over the taping material to completely fill the joint and provide a smooth surface.

One problem with conventional setting or drying type joint compounds is their friability. Cracks can develop if the joint is subject to movement either during cure or drying or after the joint compound has set or dried.

An application in which particular problems occur is factory manufactured houses or manufactured house modules. When components such as ceiling and walls are moved about during the construction process joint movement can occur and cracking can occur. Also, as the partially completed structure is moved through the various manufacturing steps the joints are subject to movement that can cause cracks. Additionally, as the completed structure is moved from the point of manufacture to another site the structure is subjected to bending, racking and twisting motion that can cause joints to flex and crack. The action of transport can result in excessive mechanical stress that causes cracks to form in the joints of the fabricated gypsum board surfaces.

An example of drying type compounds for flexible joints is described in U.S. Pat. No. 5,494,947. They contain an acrylate resin, a biocide, a reinforcing agent, a latex (preferably a styrene/butadiene copolymer), surfactants, a plasticizer, coalescents, a fungicide and a filler.

Traditional setting type compositions do not have sufficient flexibility and crack if the joint is subjected to movement.

A setting type joint compound that is said to retain flexibility after hardening is disclosed in U.S. Pat. No. 6,884,830. It comprises calcium sulfate hemihydrate as reactive filler (hydraulic binder) and an emulsion polymer having a Tg of less than −40° C. (preferably a copolymer of 2-ethylhexyl acrylate) as adhesion promoter and additional binder. Due to the high amount of hydraulic binder in this joint compound, it cannot be stored as a ready-mix, i.e. as an aqueous composition. Thus, it requires inconvenient mixing of the dry components and aqueous components (water and polymer emulsion) just prior to use.

It is the object of the present invention to provide a new joint compound that can be used as a ready mix (i.e. no addition of water is required prior to use) and, after drying, results in a highly flexible material having sufficient adhesion strength to avoid crack formation in the joint. The new joint compound should be suitable to be used with conventional joint tape or without conventional joint tape.

The object is met by an aqueous dispersion comprising (a) at least one (meth)acrylic polymer; (b) at least one vinyl acetate polymer selected from vinyl acetate homopolymer and vinyl acetate copolymers comprising in polymerized form vinyl acetate and ethylene; (c) water; and (d) optionally up to 50% by weight of an inorganic filler, based on the total weight of the aqueous dispersion, wherein the weight ratio of (meth)acrylic polymer(s) (a) to vinyl acetate polymer(s) (b) is from 70:30 to 30:70.

The present invention also relates to the use of said aqueous dispersion as a sealing or joint compound, preferably for filling wallboard joints.

Moreover, the present invention is concerned with a method for producing flexible joints comprising (i) providing a first planar substrate having a first edge; (ii) abutting a second edge of a second planar substrate, thereby forming a joint; (iii) applying said aqueous dispersion to the joint; and (iv) allowing the aqueous dispersion to dry.

The major components of the aqueous dispersion according to the present invention are the (meth)acrylic polymer(s) (a) and the vinyl acetate polymer(s) (b). They both function as binders and their combination is responsible for the surprisingly good performance of the aqueous dispersion as joint and sealing compound.

The term "(meth)acrylic polymer" (a) is herein meant to include any homopolymer or copolymer comprising structural units derived from acrylic acid, methacrylic acid, any acrylic acid ester(s) (acrylate(s)), any methacrylic acid ester(s) (methacrylate(s)), or combinations thereof. Typical (meth)acrylic polymers (a) include homo- and copolymers of acrylic acid, methacrylic acid; acrylates such as methyl acrylate, ethyl acrylate, propyl acrylate, butyl acrylate, 2-ethylhexyl acrylate, cyclohexyl acrylate, decyl acrylate, isodecyl acrylate, benzyl acrylate, isobornyl acrylate and neopentyl acrylate; methacrylates such as methyl methacrylate, ethyl methacrylate, propyl methacrylate, butyl methacrylate, 2-ethylhexyl methacrylate, cyclohexyl methacrylate, decyl methacrylate, isodecyl methacrylate, benzyl methacrylate, isobornyl methacrylate and neopentyl methacrylate; and optional ethylenically unsaturated comonomers including but not being limited to ethylenically unsaturated nitriles such as acrylonitrile and methacrylonitrile; amides of ethylenically unsaturated carboxylic acids such as acrylamide, methacrylamide, n-methylolacrylamide, N-methylolmethacrylamide, N-(alkoxymethyl)acrylamides or N-(alkoxymethyl)methacrylamides with a $C_1$- to $C_6$-alkoxy group, such as N-(isobutoxymethyl) acrylamide (IBMA), N-(isobutoxymethyl) methacrylamide (IBMMA), N-(n-butoxy-methyl)-acrylamide (NBMA) and N-(n-butoxy-methyl)-methacrylamide (NBMMA); styrene-type monomers such as styrene itself, α-methylstyrene, o-, m- and p-methylstyrene, o-, m-, and p-ethylstyrene, t-butylstyrene, p-chlorostyrene, and p-bromostyrene; unsaturated dicarboxylic acids such as itaconic acid and fumaric acid; and straight-chain and branched-chain vinyl esters such as vinyl acetate, vinyl isopropyl acetate, vinyl propionate, vinyl butyrate, vinyl laurate, vinyl benzoate, vinyl pivalate, vinyl neo-nonanoate, vinyl 2-ethyl hexanoate, vinyl neo-decanoate, vinyl neo-undecanoate, and vinyl neo-dodecanoate.

In a preferred embodiment the (meth)acrylic polymer (a) is a homopolymer or copolymer wherein the total amount of structural units derived from any (meth)acrylate(s) constitutes at least 40% by weight, more preferably at least 50% by weight, and most preferably at least 60% by weight of the (meth)acrylic polymer (a). Preferably, the (meth)acrylic polymer (a) is an acrylic polymer, i.e. a homopolymer or copolymer comprising structural units derived from any acrylate(s) as major components in total amounts as listed above. More preferably, the (meth)acrylic polymer (a) is an ethyl acrylate/acrylonitrile copolymer comprising structural units derived from ethyl acrylate and acrylonitrile, typically in a total amount of at least 40% by weight, more preferably at least 50% by weight, and most preferably at least 60% by weight of the (meth)acrylic polymer (a). Even more preferably, the (meth)acrylic polymer (a) is a copolymer comprising structural units derived from ethyl acrylate, 2-ethylhexyl acrylate, and acrylonitrile, typically in a total amount of at least 50% by weight, more preferably at least 60% by weight, and most preferably at least 70% by weight of the (meth) acrylic polymer (a). In a preferred embodiment the (meth) acrylic polymer (a) is an ethyl acrylate/acrylonitrile copolymer comprising from about 30 to about 95% of copolymerized ethyl acrylate; from about 2 to about 40% of copolymerized acrylonitrile; from about 0 to about 68% of copolymerized butyl acrylate; from about 0 to about 68% of copolymerized isobutyl acrylate; from about 0 to about 60% of copolymerized methyl methacrylate; from about 0 to about 50% of copolymerized 2-ethylhexyl acrylate; from about 0 to about 50% of copolymerized vinyl acetate; from about 0 to about 10% of copolymerized N-methylolacrylamide; from about 0 to about 50% of copolymerized styrene, from about 0 to about 5% of copolymerized acrylic acid; from about 0 to about 5% of copolymerized methacrylic acid; and from about 0 to about 5% of copolymerized itaconic acid, wherein all percentages are by weight based on the total weight of the polymer. Particularly preferred are ethyl acrylate/acrylonitrile copolymers comprising from about 55 to about 85% of copolymerized ethyl acrylate; from about 2 to about 15% of copolymerized acrylonitrile; from about 0 to about 15% of copolymerized 2-ethylhexyl acrylate; from about 0 to about 25% of copolymerized styrene; from about 1 to about 3% of a copolymerized ethylenically unsaturated carboxylic acid selected from the group consisting of acrylic acid, methacrylic acid, and itaconic acid, and from about 1 to about 4% of copolymerized N-methylolacrylamide. An especially preferred (meth)acrylic polymer (a) is a copolymer of ethyl acrylate, 2-ethylhexyl acrylate, acrylonitrile, acrylic acid, and n-methylolacrylamide, preferably not comprising any further comonomers. Typically, said copolymer of ethyl acrylate, 2-ethylhexyl acrylate, acrylonitrile, acrylic acid, and N-methylolacrylamide comprises the copolymerized monomers in the amounts listed above. Illustrative (meth)acrylic polymers (a) for use in the present invention copolymers are described in U.S. Pat. No. 4,678,711. They are for example commercially available in latex form from UCAR Emulsion Systems, Cary, N.C., U.S.A., under the trademarks UCAR® Latex 163S and UCAR® Latex 154.

Typically, the (meth)acrylic polymer (a) has a glass transition temperature Tg of no more than 20° C., preferably no more than 10° C., more preferably no more than 0° C., and most preferably no more than −10° C. The glass transition temperature (Tg) of the dried polymer films is measured with a TA Instruments Q-100 Modulated Differential Scanning Calorimeter in the temperature range of −90° C. to 100° C. at a scan rate of 20° C/min. The Tg values reported are the mid-point values. These are temperature values in degrees C. corresponding to the midpoint of the slope change in the energy (heat) flow-temperature plot.

It is understood that the aqueous dispersion according to the present invention may comprise a single (meth)acrylic polymer (a) or a mixture or blend of (meth)acrylic polymers (a) as described above.

The (meth)acrylic polymers (a) for use in the present invention can be prepared as it is well known to the person skilled in the art. Typically, they are prepared by emulsion polymerization and are thus obtained in the form of polymer latices. Several (meth)acrylic polymers (a) that are useful in the present invention are commercially available. Further to those mentioned above, Rhoplex™ 3805 is another example of a useful (meth)acrylic polymer (a) in latex form and is available from Rohm and Haas Company, Philadelphia, Pa., U.S.A.

The vinyl acetate polymer (b) for use in the present invention is either a vinyl acetate homopolymer or a vinyl acetate copolymer comprising in polymerized form vinyl acetate and ethylene and optional ethylenically unsaturated comonomers. The vinyl acetate polymer (b) is different form the (meth)acrylic polymer (a). Preferably, the vinyl acetate polymer (b) is a vinyl acetate copolymer comprising in polymerized form vinyl acetate and ethylene and optional ethylenically unsaturated comonomers. Typically, the vinyl acetate copolymer comprises 0 to 25% by weight of optional comonomers. Preferably, the vinyl acetate copolymer comprises in polymerized form 70 to 95% by weight, more preferably 80 to 90% by weight, and most preferably 82 to 87% by weight of vinyl acetate; 5 to 30% by weight, more preferably 10 to 20% by weight, and most preferably 13 to 18% by weight of ethylene; and 0 to 25% by weight, more preferably 0 to 20% by weight and most preferably 0% by weight of one or more optional comonomers, wherein all percentages are based on the total weight of the polymer. The ethylenically unsaturated comonomers that may optionally be copolymerized to form the vinyl acetate copolymer include but are not limited to vinyl esters other than vinyl acetate such as vinyl propionate, vinyl butyrate, vinyl benzoate, vinyl 2-ethylhexanoate, vinyl stearate and the vinyl esters of versatic acid; alkyl vinyl ethers, typically $C_1$-$C_8$ alkyl vinyl ethers such as methyl vinyl ether, ethyl vinyl ether, isopropyl vinyl ether, n-propyl vinyl ether, tert-butyl vinyl ether, n-butyl vinyl ether, and isobutyl vinyl ether; amides and $C_1$-$C_8$ alkyl esters of unsaturated carboxylic acids, typically of acrylic acid and methacrylic acid such as methyl methacrylate, butyl acrylate, and 2-ethylhexyl acrylate. In a most preferred embodiment the vinyl acetate polymer (b) is a vinyl acetate/ethylene copolymer not comprising any further comonomers.

Typically, the vinyl acetate polymer (b) for use in the present invention has a glass transition temperature Tg of no more than 15° C., preferably no more than 12° C., more preferably no more than 10° C., and most preferably no more than 7° C.

It is understood that the aqueous dispersion according to the present invention may comprise a single vinyl acetate polymer (b) or a mixture or blend of vinyl acetate polymers (b) as described above.

The vinyl acetate polymers (b) for use in the present invention can be prepared as it is well known to the person skilled in the art. Typically, they are prepared by emulsion polymerization and are thus obtained in the form of aqueous dispersions (polymer latices). The aqueous dispersions may be dried according to standard methods in order to obtain redispersible polymer powders. Several redispersible polymer powders on the basis of vinyl acetate/ethylene copolymers that are useful in the present invention are commercially available, e.g. Dow DLP 2140 from The Dow Chemical Company, Midland, Mich., U.S.A.; Vinnapas® 5044 N and 5046 T from Wacker Polymer Systems GmbH & Co. KG, Burghausen, Germany; Elotex® FX2300 and FX2320 from Elotex AG/SA, Sempach Station, Switzerland. Vinnapas® 7037 T from Wacker Polymer Systems GmbH & Co. KG is an example of a redispersible polymer powder on the basis of a vinyl acetate/vinylester/ethylene copolymer.

The emulsion polymerization process by which (meth) acrylic polymer (a) and vinyl acetate polymer (b) may be prepared is generally conducted at a polymerization temperature from 40 to 90° C., preferably from 60 to 80° C. In the case of the copolymerization of gaseous comonomers such as ethylene the process may also be carried out at superatmospheric pressure, generally at from 5 to 100 bar.

The polymerization is initiated using water-soluble or monomer-soluble initiators or redox-initiator combinations, these being those commonly used for emulsion polymerization. Examples of water-soluble initiators are the sodium, potassium, and ammonium salts of peroxydisulfuric acid, hydrogen peroxide, tert-butyl peroxide, tert-butyl hydroperoxide, potassium peroxydiphosphate, tert-butyl peroxypivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The amount of the initiators generally used is from 0.01 to 0.5% by weight, based on the total weight of the monomers.

Redox initiators include combinations of the initiators previously mentioned with reducing agents. Suitable reducing agents are the sulfites and bisulfites of the alkali metals and of ammonium, for example sodium sulfite, the derivatives of sulfoxylic acid, for example zinc formaldehyde sulfoxylates or alkali metal formaldehyde sulfoxylates, an example being sodium hydroxymethanesulfinate, and ascorbic acid. The amount of reducing agent is preferably from 0.01 to 0.5% by weight, based on the total weight of the monomers.

To control molecular weight, regulating substances may be used during the polymerization process. If regulators are used, the amounts usually used of these are generally from 0.01 to 5.0% by weight, based on the weight of the monomers to be polymerized, and they may be fed separately and/or after premixing with components for the reaction. Examples of these substances are n-dodecyl mercaptan, tert-dodecyl mercaptan, mercaptopropionic acid, methyl mercaptopropionate, isopropanol, and acetaldehyde. It is preferable not to use any regulating substances.

The polymerization process preferably takes place without addition of emulsifiers. In exceptional cases, it can also be advantageous to make additional use of small amounts of emulsifiers, where appropriate from 1 to 5% by weight, based on the amount of monomer. Suitable emulsifiers include anionic, cationic, and non-ionic emulsifiers, for example anionic surfactants such as alkyl sulfates whose chain length is from 8 to 18 carbon atoms, or alkyl or alkyl aryl ether sulfates having from 8 to 18 carbon atoms in the hydrophobic radical and up to 40 ethylene or propylene oxide units, alkyl- or alkylarylsulfonates having from 8 to 18 carbon atoms, esters and half esters of sulfosuccinic acid with monohydric alcohols or with alkylphenols, or non-ionic surfactants such as alkyl polyglycol ethers or alkylaryl polyglycol ethers having from 8 to 40 ethylene oxide units. All of the monomers may form an initial charge, or all of the monomers may form a feed, or portions of the monomers may form an initial charge and the remainder may form a feed after the polymerization has been initiated. The procedure is preferably that from 50 to 100% by weight, based on the total weight of the monomers, form an initial charge and the remainder forms a feed. The feeds may be separate (spatially and chronologically), or all or some of the components to be fed may be fed after preemulsification.

Once the polymerization process has ended, post-polymerization may be carried out using known methods to remove residual monomer, one example of a suitable method being post-polymerization initiated by a redox catalyst. Volatile residual monomers may also be removed by distillation, preferably at subatmospheric pressure, and, where appropriate, by passing inert entraining gases, such as air, nitrogen, or water vapor, through or over the material.

The aqueous dispersion according to the present invention comprises (meth)acrylic polymer(s) (a) and vinyl acetate polymer(s) (b) in a weight ratio of (a):(b) ranging from 30:70 to 70:30, typically from 40:60 to 60:40, preferably from 45:55 to 60:40, more preferably from 50:50 to 60:40, even more preferably from 50:50 to 55:45 and most preferably the weight ratio is about 52:48.

Typically, the aqueous dispersion according to the present invention comprises from 2 to 60% by weight, preferably from 5 to 55% by weight, more preferably from 10 to 53% by weight, even more preferably from 15 to 50% by weight, still even more preferably from 20 to 55% by weight, and most preferably from 25 to 40% by weight of water (c), based on the total weight of the aqueous dispersion.

The aqueous dispersion according to the present invention may comprise an inorganic filler (d) as optional component. The inorganic filler (d) may be selected from inert and reactive fillers and mixtures thereof. Reactive fillers are setting fillers that function as hydraulic binder in addition to the organic binder. An example of a reactive filler is calcium sulfate hemihydrate. Preferably, the inorganic filler is an inert filler. Examples of inert fillers include calcium carbonate (including naturally occurring calcium carbonates such as limestone), dolomite, clay, mica, talc, calcium sulfate dihydrate (gypsum), and mixtures thereof. The most preferred inorganic filler (d) is calcium carbonate.

The inorganic filler (d) may be present in an amount of up to 50% by weight, preferably up to 45% by weight, and most preferably up to 40% by weight, based on the total weight of the aqueous dispersion.

In a preferred embodiment of the present invention the combined weight of (meth)acrylic polymers(s) (a), vinyl acetate polymer(s) (b) and filler (d), if present, constitutes from 40 to 85% by weight, more preferably from 45 to 80% by weight, even more preferably from 50 to 75% by weight, and most preferably from 55 to 71% by weight of the total weight of the aqueous dispersion.

The filler (d) may be added to the aqueous dispersion as a separate component and/or it may be added as a constituent of another component, e.g. of a redispersible polymer powder if any or both of the (meth)acrylic polymer(s) (a) and the vinyl acetate polymer(s) (b) are added in this form.

In a preferred embodiment of the present invention the aqueous dispersion is free of any hydraulic binder.

Other optional components may be contained in the aqueous dispersion according to the present invention. For example, they may be selected from rheology modifiers (thickeners) (e), defoaming agents (densifiers) (f), preservatives (g), and mixtures thereof.

A rheology modifier (e) for use in the present invention is any agent having a thickening effect on the aqueous dispersion. Examples of rheology modifiers (e) include modified cellulose such as cellulose ethers, starches, and gums, e.g. guar and xanthan . Typical cellulose ethers for use in the present invention include hydroxyethyl cellulose, methylcellulose, hydroxypropyl methylcellulose, ethyl hydroxyethyl cellulose, hydroxypropyl cellulose, hydrophobically modified hydroxyethyl cellulose, carboxymethyl cellulose and mixtures thereof. Preferably, the cellulose ethers have a dynamic viscosity of from 1 to 25 Pa.s (1,000 to 25,000 cP) in a 2% by weight water solution. Commercially available examples of useful cellulose ethers are CELLOSIZE™ DCS HV and EMTHOCEL 240 S, both available from The Dow Chemical Company, Midland, Mich., U.S.A. The rheology modifier (e) is used in an effective amount to impart the desired viscosity to the aqueous dispersion. If used, typical amounts of rheology modifier (e) are from 0.05 to 2% by weight, preferably from 0.1 to 1% by weight, and more preferably from 0.2 to 0.5% by weight, based on the total weight of the aqueous dispersion.

A defoaming agent (f) for use in the present invention is any agent having a defoaming effect on the aqueous dispersion. There are numerous different defoaming agents known in the art and their chemical composition is not critical for the present invention. Non-limiting examples of defoaming agents (f) include poly(alkylene glycol)s such as poly(propylene glycol)s and mixtures thereof. Typical poly(propylene glycol)s (PPGs) for use in the present invention have a weight average molecular weight of from 1200 to 4000 and include ,for example, PPG-20 (commercially available e.g. from The Dow Chemical Company, Midland, Mich., U.S.A. under the tradename P1200) and PPG-30 (commercially available e.g. from The Dow Chemical Company, Midland, Mich., U.S.A. under the tradename P4000). The defoaming agent (f) is used in an amount to effect defoaming If used, typical amounts of defoaming agent (f) are less than 1% by weight, preferably from 0.01 to 0.5% by weight, and more preferably from 0.05 to 0.2% by weight, based on the total weight of the aqueous dispersion.

A preservative (g) for use in the present invention is any agent that improves shelf life stability of the aqueous dispersion. It is understood that the preservative (g) may be a single preservative or a mixtures of preservatives. Typically, the preservative (g) is a biocide, preferably avoiding bacterial and/or fungal degradation. Thus, in a preferred embodiment the preservative (g) has antimicrobial, especially antibacterial, and antifungal activity. More preferably, the preservative (g) should be effective against Gram-negative and Gram-positive bacteria. A variety of preservatives having the desired broad spectrum activity and being adapted for the application in water-based products such a latex emulsions, paints and coatings, adhesives, construction materials, detergents, floor waxes, inks, metal working fluids, pulp and paper processing and textiles are commercially available and suitable for the present invention. One example of a useful preservative is 1-(3-choroallyl)-3,5,7-triaza-1-azoniaadamantane chloride, commercially available under the trademark DOWICIL™75 from The Dow Chemical Company, Midland, Mich., U.S.A. The preservative (g) is used in an amount to effect shelf life stability of the aqueous dispersion. If used, typical amounts of preservative (g) are from 100 to 2000 ppm by weight, preferably from 200 to 1000 ppm by weight, and more preferably from 300 to 600 ppm by weight, based on the total weight of the aqueous dispersion.

The aqueous dispersion according to the present invention may be readily prepared by simply mixing mandatory components (a) to (c) and optional components (d) to (g) and further optional components, if desired.

The (meth)acrylic polymer(s) (a) can be employed in the form of an aqueous dispersion (latex) or as dried redispersible polymer powder. Preferably, they are incorporated into the aqueous dispersion of the present invention in the form of a latex.

The vinyl acetate polymer(s) (b) can be employed in the form of an aqueous dispersion (latex) or as dried redispersible polymer powder. Preferably, they are incorporated into the aqueous dispersion of the present invention as dried redispersible polymer powder.

According to one method of preparing the present aqueous dispersion the vinyl acetate polymer(s) (b) employed in the form of a redispersible polymer powder may be first dry mixed with any further solid component(s), e.g. optional filler (d), and then the resulting particulate mixture is mixed with the (meth)acrylic polymer(s) (a) employed in the form of a latex, any additional water and any further optional liquid component(s) to form the aqueous dispersion according to the present invention. Preferably, the liquid components are mixed with each other prior to mixing with the particulate mixture.

The redispersible polymer powders that may be employed to introduce the (meth)acrylic polymer(s) (a) and/or vinyl acetate polymer(s) (b) into the aqueous dispersion according to the present invention are prepared from aqueous dispersions (latices) of the corresponding polymers. The solids content of said latices is generally from 30 to 75% by weight. To prepare the redispersible polymer powders the latices are dried, for example by spray drying, freeze drying or fluidized-bed drying. Preferably the latices are spray dried. Spray drying is typically performed after addition of one or more protective colloids as a spraying aid to the dispersion, preferably in the form of an aqueous solution. Addition can proceed in any manner as long as a homogenous dispersion mixture is obtained. Further additives such as surfactants and defoamers may be employed, if desired, and said further additives are preferably added to the latex before drying. The total amount of protective colloid(s) used is generally from 2 to 30% by weight, based on the polymeric components of the dispersion. Examples of protective colloids include but are not limited to polyvinyl alcohol, water-soluble polysaccharides, cellulose derivatives, proteins such as caseinate, lignosulfonate and several water-soluble polymers. Preferred protective colloids are polyvinyl alcohols with a degree of hydrolysis of 80 to 95 mole % and a Hoeppler viscosity of 1 to 30 mPa.s, measured as a 4 weight % aqueous solution at 20° C. according to DIN 53015.The polyvinyl alcohols are optionally hydrophobically modified. The amount of the polyvinyl alcohols is preferably from 2 to 20% by weight, more preferably from 5 to 15% by weight, based on the total weight of polymeric constituents.

The spray drying can take place in conventional spray drying systems, for example a dispersion may be atomized by using single, twin or multifluid nozzles or a rotating disk in a stream of drying gas which may be heated. In general, air, nitrogen or nitrogen enriched air is employed as the drying gas, the drying gas temperature typically not exceeding 250° C. The drying temperature preferably is from 120 to 180° C., more preferably from 150 to 170° C. The product outlet temperature preferably is from 30 to 80° C.

An anticaking agent (antiblocking agent) may be added to the polymer powder to increase storage stability, for example in order to prevent caking and blocking and/or to improve the flow properties of the powder. This addition is preferably carried out as long as the powder is still finely dispersed, for example still suspended in the drying gas. The anticaking agent is preferably of mineral origin. It is preferably added in an amount of up to 30% by weight, based on the total weight of polymeric constituents. Examples of anticaking agents include but are not limited to kaolin, calcium carbonate, magnesium carbonate, talc, gypsum, silica and silicates, such as aluminum silicate, the particle sizes of the anticaking agents are preferably in the range of from 10 nm to 10 μm. A preferred anticaking agent is kaolin. The redispersible polymer powder may comprise both a protective colloid and an anticaking agent. More than one protective colloid and more than one anticaking agent may be used.

Introducing (meth)acrylic polymer(s) (a) and/or vinyl acetate polymer(s) (b) in the form of redispersible polymer powders into the aqueous dispersion according to the present invention may lead to the simultaneous introduction of any of the above additives of the redispersible polymer powders into the aqueous dispersion, said additives becoming constituents of the final aqueous dispersion according to the present invention. It is understood that the amount of anticaking agent that may be comprised in the redispersible polymer powder(s) contributes to the total amount of inorganic filler (d) that is contained in the aqueous dispersion according to the present invention.

The aqueous dispersion according to the present invention is a creamy compound having a paste-like consistency. It can easily be troweled onto a substrate. After drying the aqueous dispersion results in a material showing high flexibility and high adhesion strength to various substrates. This unique combination of properties makes the aqueous dispersion according to the present invention especially suitable for use as a joint or sealing compound. In one embodiment the aqueous dispersion is used as a tape joint compound. A preferred use of the aqueous dispersion is as a (tape) joint compound for filling wallboard joints. However, it may also be used to fill the gap between two adjoining insulation panels, for example, Styrofoam® Board, on the exterior of a structure.

Typically, the dried material resulting from the aqueous dispersion according to the present invention has from 17% to 270% elongation at break (determined according to a standard Instron tensile test as described in the examples) which is much higher than the elongation at break of conventional joint compounds (only about 0.4%).

Typically, the dried material resulting from the aqueous dispersion according to the present invention has from 0.226 to 0.546 N/mm (1.29 to 3.12 lbf/in) bond strength to tape paper or the paper fiber of wallboard (determined according to a 90 degree t-peel test as described in the examples) which is much higher than the bond strength of conventional joint compounds (only about 0.157 N/mm (0.90 lbf/in)).

High flexibility (high elongation at break) and high adhesion strength (bond strength) are the two critical performance attributes necessary to avoid crack formation at the joint between abutting wallboards. When the aqueous dispersion according to the present invention is applied between two abutting wallboard panels and dried, it forms a monolithic surface that resists cracking.

A method for producing flexible joints comprises (i) providing a first planar substrate having a first edge; (ii) abutting a second edge of a second planar substrate, thereby forming a joint; (iii) applying the aqueous dispersion as described above to the joint; and (iv) allowing the aqueous dispersion to dry. In step (iii) the aqueous dispersion may, for example, be troweled to the joint by using a conventional broadknife. Optionally, a joint tape such as a joint tape made of fiberglass, cloth or paper may be applied to the joint prior to step (iii) or be embedded into the aqueous dispersion prior to step (iv). In case a joint tape is embedded into the aqueous dispersion, if desired, a further layer of the aqueous dispersion may be applied to the joint in order to completely hide the joint tape and provide a smooth surface. In the method according to the present invention the planar substrates are preferably wallboards (also known as drywalls or gypsum board panels or gypsum plaster boards).

While principles of the invention are amenable to various modifications and alternatives forms, particular species have been described. It should be understood that the intent of this description is not to limit the invention to the particular embodiments described, but rather to cover all modifications, equivalents, and alternatives falling within the spirit and scope of the disclosure. Use of the terms "comprising", "comprises" and variations thereof are intended to be open-ended. Thus, elements, steps or features not expressly listed or described are not excluded.

The following examples are provided for illustrative purposes only and are not intended to limit the scope of the claims that follow. Unless otherwise indicated, all parts and percentages are by weight.

EXAMPLES

Two exemplary dispersions Example 1 and Example 2 useful as joint compounds are prepared by mixing the components shown in the Table. Particulate components (polymer powder, inorganic filler, thickener, and preservative) are dry blended with each other and liquid components (acrylic latex, defoamer and water) are blended with each other. Then the particulate mixture is slowly added to the liquid mixture under agitation. Mixing continues until a homogeneous formulation is obtained. This takes approximately 10 min.

The Comparative Example has the composition of a typical commercially available, all purpose, ready-mix tape joint compound.

Various properties of the formulations of Example 1, Example 2 and the Comparative Example being essential for their performance as joint compounds are tested and the results are also shown in the Table.

Test Methods

Crack resistance: Templates are fabricated from 6.35 mm (¼ inch) Plexiglas®. A 69.85 mm (2 ¾ inch) diameter circle is cut away from the Plexiglas®. The template is placed on a piece of wall board. The formulation is spread into the 69.85 mm (2 ¾ inch) diameter, 6.35 mm (¼ inch) deep cylinder. The formulation is allowed to dry, usually over night, in a controlled environment at 21° C. (70° F.) and 50% relative humidity. After drying, the sample is compared to series of standards and rated for crack resistance as excellent, good, OK, poor, or bad.

Bond strength: Using 0.635 mm ($^{25}/_{1000}$ inch) feeler gauges, the formulation is applied to a piece of wall board. A template is used to reproduce the exact same geometry. A piece of tape paper is embedded in the formulation. The tape paper is 152.4 mm (6 inch) long, with 101.6 mm (4 inch) being embedded and 50 8 mm (2 inch) not embedded, The formulation is allowed to dry in a controlled environment at 21° C. (70° F.) and 50% relative humidity. Using the 50 8 mm (2 inch), non embedded tail to hold on to, a tensile tester pulls apart the tape paper from the formulation in a 90 degree t-peel test and quantifies the amount of force required to break the bond.

Elongation at break: The formulation is applied to a piece of Mylar® sheet by using feeler gauges to form a geometry of 152.4 mm (6 inch) by 25 4 mm (1 inch) by 0.635 mm (25/1000 inch). The formulation is allowed to dry in a controlled environment at 21° C. (70° F.) and 50% relative humidity. The formulation is then peeled off of the Mylar® sheet, it comes off easily. It is then placed in the jaws of an standard Instron tensile tester. The tensile tester pulls it apart and quantifies the % elongation at the break point.

Flex test: The formulation is applied to a piece of Mylar® sheet, using 0.635 mm (25/1000inch) feeler gauge. The length and width, although not critical for this test, are approximately 25.4 mm (1 inch) by 152.4 mm (6 inch). The formulation is allowed to dry. The Mylar® sheet is then flexed/deformed to make a 90 degree angle. The Mylar® sheet is then allowed to come back to a flat, initial geometry. The formulation is observed for any cracks, deformation points, and similar damages. If it does not have any damages, it passes.

82.4% by weight of copolymerized vinyl acetate and 17.6% by weight of copolymerized ethylene, based on the weight of the vinyl acetate/ethylene copolymer) and is stabilized with 15% by weight of polyvinyl alcohol, based on the weight of the redispersible polymer powder; Tg =6° C.

The vinyl acetate/butyl acrylate latex used in the Comparative Example contains a copolymer comprising 85% by weight of copolymerized vinyl acetate and 15% by weight of copolymerized butyl acrylate; Tg =25° C. The solids content (copolymer content) of the latex is 60% by weight.

CELLOSIZE™ DCS HV is hydroxyethyl cellulose and commercially available from The Dow Chemical Company, Midland, Mich., U.S.A.

METHOCEL™ 240 S is hydroxypropyl methyl cellulose and commercially available from The Dow Chemical Company, Midland, Mich., U.S.A.

Dow Polypropylene Glycol P1200 is PPG-20 commercially available from The Dow Chemical Company, Midland, Mich., U.S.A.

DOWICIL™ 75 is 1-(3-choroallyl)-3,5,7-triaza-1-azoniaadamantane chloride and commercially available from The Dow Chemical Company, Midland, Mich., U.S.A.

It is evident from the Table that the formulations according to the present invention (Examples 1 and 2) show considerably improved flexibility and bond strength compared to a typical tape joint compound (Comparative Example).

TABLE

Compositions and Properties of Joint Compounds

|  | Example 1 | Example 2 | Comparative Example |
|---|---|---|---|
| COMPOSITION |  |  |  |
| Acrylic latex comprising a (meth)acrylic polymer (a) (UCAR ® Latex 163S)/g | 345.00 | 207.00 | — |
| Redispersible polymer powder comprising vinyl acetate/ethylene copolymer (b)/g | 220.00 | 132.00 | — |
| Vinyl acetate/butyl acrylate latex/g | — | — | 20.00 |
| Inorganic filler |  |  |  |
| limestone/g | — | 300.00 | 458.00 |
| mica/g | — | — | 27.00 |
| clay/g | — | — | 15.00 |
| Aluminum Silicate/g | 27.5 | 16.5 | — |
| Sodium Oleate/g | 27.5 | 16.5 | — |
| Thickener |  |  |  |
| CELLOSIZE ™ DCS HV/g | 2.00 | 2.00 | — |
| METHOCEL ™ 240 S/g | — | — | 3.00 |
| Defoamer (Dow Polypropylene Glycol P1200)/g | 0.50 | 0.50 | — |
| Preservative (DOWICIL ™ 75)/g | 0.40 | 0.40 | 0.40 |
| Water/g | 130.00 | 130.00 | 220.00 |
| PROPERTIES |  |  |  |
| Crack resistance | excellent | excellent | good-excellent |
| Bond strength/N/mm (lbf/in) | 0.43 (1.95) | 0.33 (1.90) | 0.08 (0.47) |
| Elongation/% | 233 | 38 | 0.4 |
| Flex test | passed | passed | Failed |

UCAR® Latex 163S is commercially available from UCAR Emulsion Systems, Cary, N.C., U.S.A. It is an aqueous dispersion (solids content 58% by weight) of a copolymer of ethyl acrylate, 2-ethylhexyl acrylate, acrylonitrile, acrylic acid, and N-methylolacrylamide; Tg =–11° C.

The redispersible polymer powder comprises 85% by weight of a vinyl acetate/ethylene copolymer (consisting of

What is claimed is:

1. An aqueous dispersion comprising:
   (a) at least one ethyl acrylate/acrylonitrile copolymer comprising structural units derived from ethyl acrylate and acrylonitrile;
   (b) at least one vinyl acetate polymer selected from vinyl acetate homopolymer and vinyl acetate copolymers comprising in polymerized form vinyl acetate and ethylene;
(c) water; and
(d) optionally up to 50% by weight of an inorganic filler, based on the total weight of the aqueous dispersion,
(e) hydroxyethyl cellulose,
(f) aluminum silicate, and
(g) sodium oleate, wherein the weight ratio of ethyl acrylate/acrylonitrile copolymer(s) (a) to vinyl acetate polymer(s) (b) is from 30:70 to 70:30, selected such that the aqueous dispersion, when dried, has from 17% to 270% elongation at break, and from 0.226 to 0.546 N/mm bond strength to paper.

2. The aqueous dispersion according to claim 1, wherein the combined weight of ethyl acrylate/acrylonitrile copolymer(s) (a), vinyl acetate polymer(s) (b), and filler (d), if present, constitutes from 40 to 85% by weight of the total weight of the aqueous dispersion.

3. The aqueous dispersion according to claim 2 wherein the total amount of the structural units derived from ethyl acrylate and acrylonitrile is at least 40% by weight of the ethyl acrylate/acrylonitrile copolymer (a).

4. The aqueous dispersion according to claim 2 wherein the ethyl acrylate/acrylonitrile copolymer (a) comprises from 30 to 95% of copolymerized ethyl acrylate; from 2 to 40% of copolymerized acrylonitrile; from 0 to 68% of copolymerized butyl acrylate; from 0 to 68% of copolymerized isobutyl acrylate; from 0 to 60% of copolymerized methyl methacrylate; from 0 to 50% of copolymerized 2-ethylhexyl acrylate; from 0 to 50% of copolymerized vinyl acetate; from 0 to 10% of copolymerized N-methylolacrylamide; from 0 to 50% of copolymerized styrene, from 0 to 5% of copolymerized acrylic acid; from 0 to 5% of copolymerized methacrylic acid; and from 0 to 5% of copolymerized itaconic acid, wherein all percentages are by weight based on the total weight of the ethyl acrylate/acrylonitrile copolymer (a).

5. The aqueous dispersion according to claim 2 wherein the vinyl acetate polymer (b) is a vinyl acetate/ethylene copolymer having a glass transition temperature of no more than 15° C.

6. The aqueous dispersion according to claim 1 wherein the total amount of the structural units derived from ethyl acrylate and acrylonitrile is at least 40% by weight of the ethyl acrylate/acrylonitrile copolymer (a).

7. The aqueous dispersion according to claim 6 wherein the ethyl acrylate/acrylonitrile copolymer (a) is a copolymer comprising structural units derived from ethyl acrylate, 2-ethylhexyl acrylate, and acrylonitrile.

8. The aqueous dispersion according to claim 7 wherein the vinyl acetate polymer (b) is a vinyl acetate/ethylene copolymer having a glass transition temperature of no more than 15° C.

9. The aqueous dispersion according to claim 8 wherein the inorganic filler (d) is selected from limestone, dolomite, clay, mica, talc, gypsum, and mixtures thereof.

10. The aqueous dispersion according to claim 8 which is free of any hydraulic binder.

11. The aqueous dispersion according to claim 1 wherein the ethyl acrylate/acrylonitrile copolymer (a) comprises from 30 to 95% of copolymerized ethyl acrylate; from 2 to 40% of copolymerized acrylonitrile; from 0 to 68% of copolymerized butyl acrylate; from 0 to 68% of copolymerized isobutyl acrylate; from 0 to 60% of copolymerized methyl methacrylate; from 0 to 50% of copolymerized 2-ethylhexyl acrylate; from 0 to 50% of copolymerized vinyl acetate; from 0 to 10% of copolymerized N-methylolacrylamide; from 0 to 50% of copolymerized styrene, from 0 to 5% of copolymerized acrylic acid; from 0 to 5% of copolymerized methacrylic acid; and from 0 to 5% of copolymerized itaconic acid, wherein all percentages are by weight based on the total weight of the ethyl acrylate/acrylonitrile copolymer (a).

12. The aqueous dispersion according to claim 1 wherein the ethyl acrylate/acrylonitrile copolymer (a) is a copolymer comprising structural units derived from ethyl acrylate, 2-ethylhexyl acrylate, and acrylonitrile.

13. The aqueous dispersion according to claim 1 wherein the vinyl acetate polymer (b) is a vinyl acetate/ethylene copolymer having a glass transition temperature of no more than 15° C.

14. The aqueous dispersion according to claim 1 wherein the inorganic filler (d) is selected from limestone, dolomite, clay, mica, talc, gypsum, and mixtures thereof.

15. The aqueous dispersion according to claim 1 which is free of any hydraulic binder.

* * * * *